US 6,669,155 B2

(12) United States Patent
Ron

(10) Patent No.: US 6,669,155 B2
(45) Date of Patent: Dec. 30, 2003

(54) MOUNTING DEVICE

(75) Inventor: Gil Ron, Miami, FL (US)

(73) Assignee: Advancetec Industries, Inc., Miami, FL (US)

( * ) Notice: Subject to any disclaimer, the term of this patent is extended or adjusted under 35 U.S.C. 154(b) by 0 days.

(21) Appl. No.: 10/128,351

(22) Filed: Apr. 24, 2002

(65) Prior Publication Data

US 2003/0201370 A1 Oct. 30, 2003

(51) Int. Cl.[7] ............... F16M 11/00; F16M 11/12; E04G 3/00
(52) U.S. Cl. ................ 248/276.1; 248/176.1; 248/183.1
(58) Field of Search .......... 248/176.1, 179.1, 248/183.1, 276.1, 278.1, 284.1, 291.1, 311.2, 186.2

(56) References Cited

U.S. PATENT DOCUMENTS

| | | | |
|---|---|---|---|
| 1,410,052 A | | 3/1922 | Bobek |
| 3,495,857 A | * | 2/1970 | Hawke ............ 403/57 |
| 3,756,089 A | | 9/1973 | Haladay |
| 3,858,836 A | | 1/1975 | Marcyan |
| 4,470,106 A | | 9/1984 | Norton |
| 4,797,916 A | | 1/1989 | Kojima |
| 5,016,851 A | | 5/1991 | Koskinen et al. |
| 5,109,411 A | | 4/1992 | O'Connell |
| 5,187,744 A | | 2/1993 | Richter |
| 5,201,896 A | | 4/1993 | Kruszewski |
| 5,582,488 A | | 12/1996 | Dudley et al. |
| 5,738,322 A | | 4/1998 | Huang |
| 5,853,158 A | | 12/1998 | Riggle |
| 5,975,472 A | | 11/1999 | Hung |
| 6,116,554 A | * | 9/2000 | Wei .............. 248/183.1 |
| D431,999 S | * | 10/2000 | Haltof ............. D8/354 |
| 6,161,741 A | * | 12/2000 | French ............ 224/192 |
| 6,244,553 B1 | * | 6/2001 | Wang ............. 248/278.1 |
| 2001/0035444 A1 | * | 11/2001 | Alis .............. 224/250 |
| 2002/0100782 A1 | * | 8/2002 | Marvin ........... 224/483 |

* cited by examiner

Primary Examiner—Leslie A. Braun
Assistant Examiner—Amy J. Sterling
(74) Attorney, Agent, or Firm—Lowe Hauptman Gilman & Berner LLP

(57) ABSTRACT

A mounting includes a connector connecting a first base to a second base so the first base can rotate about a first axis and the second base can rotate about a second axis. The connector includes aligned first links extending in parallel planes at right angles to the first axis and plural aligned second links extending in parallel planes at right angles to the second axis. Slots between the first and second links respectively receive, in an interleaved manner, (1) aligned third links of the first base, and (2) aligned fourth links of the second base. The first and second links extend in opposite directions from a central plate of the connector.

25 Claims, 4 Drawing Sheets

MOUNTING DEVICE

FIELD OF INVENTION

The present invention relates generally to mounting devices and more particularly to a mounting device including first and second bases respectively adapted to have a first structure mounted thereon and to be mounted on a second structure, wherein a connector connects the bases so the bases can be turned about two different axes. Another aspect of the invention relates to a connector of such a mounting device.

BACKGROUND ART

A mounting device has been developed for enabling a cellular telephone holder to be mounted on an automotive vehicle dashboard and/or console so the holder can turn in one direction about an axis that is typically either vertically or horizontally disposed. The prior art device includes a first base adapted to carry the cellular telephone holder and a second base rotatably connected to the first base and adapted to be fixedly mounted on the dashboard and/or console. The first base includes a tongue having plural aligned first spaced links each extending in parallel planes oriented in a first direction so there are first plural slots extending in the first direction between the first links. The second base includes plural aligned second spaced links each extending in parallel planes oriented in the first direction so there are plural second slots extending in the first direction between the second links. The first and second links and first and second slots are interleaved with each other for enabling the first base to turn relative to the second base about an axis at right angles to the first direction. A fastener, in the form of a bolt, that extends along the axis at right angles to the first direction, fastens the first and second bases to each other in such a manner that the second base can be turned with respect to the first base.

The first base includes a plate having first and second faces respectively secured to the tongue and dashboard or console. Screws or the like extend through openings in the plate to secure the plate to the dashboard or console, while a single screw and mating teeth on the plate and tongue secure the plate and tongue to each other. The plate and base can be turned with respect to each other to a selected angle only prior to installation of the base on the dashboard or console. The matching and engaging teeth on the plate and tongue maintain the base and plate at the selected angle while the mounting device is installed on the dashboard or console.

Many users of cellular telephones are desirous of having a cellular telephone holder mounted with two degrees of freedom, such that the holder can be turned in two different directions after installation of a mounting device on a dashboard or console. The greatest degree latitude can be obtained by having the holder turn about horizontal and vertical axes. It is also necessary for mounting devices for small objects, such as cellular telephones, to be as inexpensive as possible.

It is, accordingly, an object of the present invention to provide a new and improved mounting device.

Another object of the present invention is to provide a new and improved mounting device wherein a structure carried by the mounting device can be turned about two different axes after installation.

An additional object of the present invention is to provide a new and improved mounting device particularly adapted to be used for mounting relatively small structures, such as cellular telephone holders, in automotive vehicles, wherein the small structure can be mounted with two degrees of freedom.

SUMMARY OF THE INVENTION

In accordance with one aspect of the present invention, a device for mounting a first structure on a second structure comprises a first base adapted to have the first structure mounted thereon, and a second base adapted to be mounted on the second structure. The first base includes plural aligned first spaced links each extending in parallel planes oriented in a first direction so there is at least one first slot extending in the first direction between the first links. The second base includes plural aligned second links, each extending in parallel planes oriented in a second direction so there is at least one second slot extending in the second direction between the second links. A connector connects the first base to the second base. The connector includes (1) plural aligned third spaced links each extending in parallel planes oriented in the first direction so there is at least one third slot extending in the first direction between the third links, and (2) plural aligned fourth spaced links each extending in parallel planes oriented in the second direction so there is at least one fourth slot extending in the second direction between the fourth links. The first and third links and first and third slots are interleaved with each other for enabling the first base to turn relative to the connector about a first axis at right angles to the first direction. The second and fourth links and second and fourth slots are interleaved with each other for enabling the second base to turn relative to the connector about a second axis at right angles to the second direction. A first fastener fastens the first base to the connector, and a second fastener fastens the second base to the connector.

Preferably, the first fastener extends longitudinally along the first axis and the second fastener extends longitudinally along the second axis. In the preferred embodiment, the first fastener includes a first bolt having a longitudinal axis extending along the first axis, the second fastener includes a second bolt having a longitudinal axis extending along the second axis, and the first and second axes are at right angles to each other.

Another aspect of the invention relates to a connector for connecting a first base to a second base so the first base can rotate about a first axis extending in a first direction and the second base can rotate about a second axis extending in a second direction. The connector comprises (1) a plurality of aligned first spaced links each extending in parallel planes oriented at right angles to the first axis so there is at least one first slot between the first spaced links extending in the same direction as the longitudinal axis of the plurality of first spaced links, and (2) a plurality of aligned second spaced links each extending in parallel planes oriented at right angles to the second axis so there is at least one second slot between the second spaced links extending in the same direction as the longitudinal axis of the plurality of the second spaced links. The first spaced links and the at least one first slot are adapted to receive aligned third spaced links of the first base in an interleaved manner. The second spaced links and the at least one second slot are adapted to receive aligned fourth spaced links of the second base in an interleaved manner. The first and second spaced links preferably extend in opposite directions from a central portion of the connector.

The above and still further objects, features and advantages of the present invention will become apparent upon

DETAILED DESCRIPTION OF THE DRAWING

Figure 1:
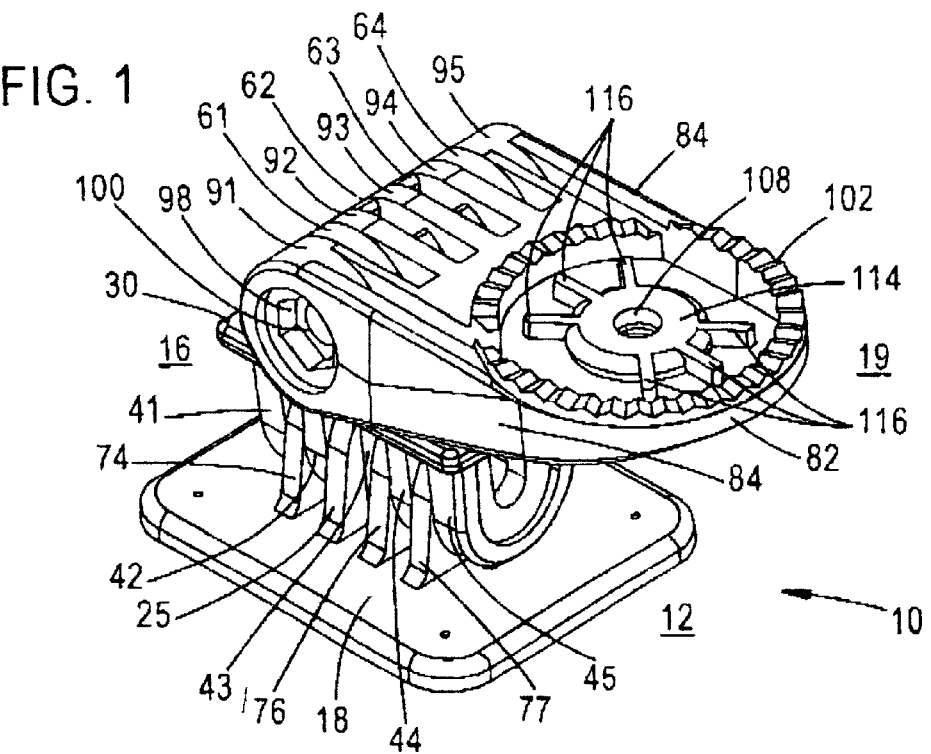
FIG. 1 is a perspective view from a first direction of a preferred embodiment of a mounting device in accordance with the present invention, except that a mounting plate has been excluded.
Figure 2:
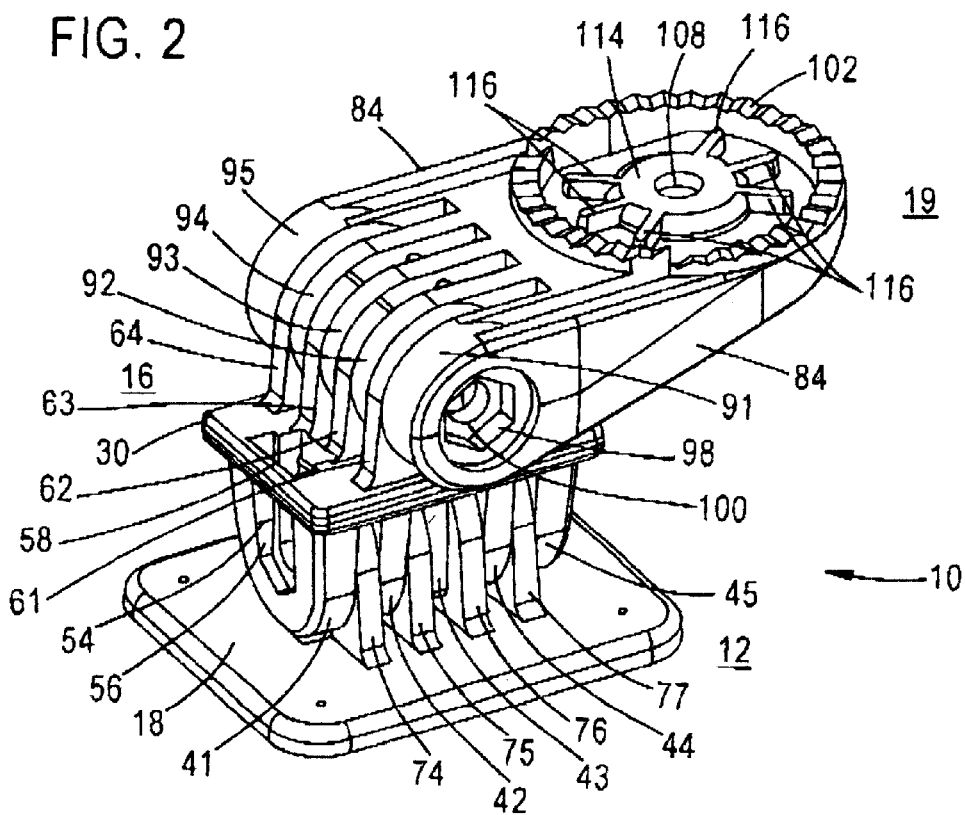
FIG. 2 is a perspective view from a second direction of the mounting device, as illustrated in FIG. 1.
Figure 3:
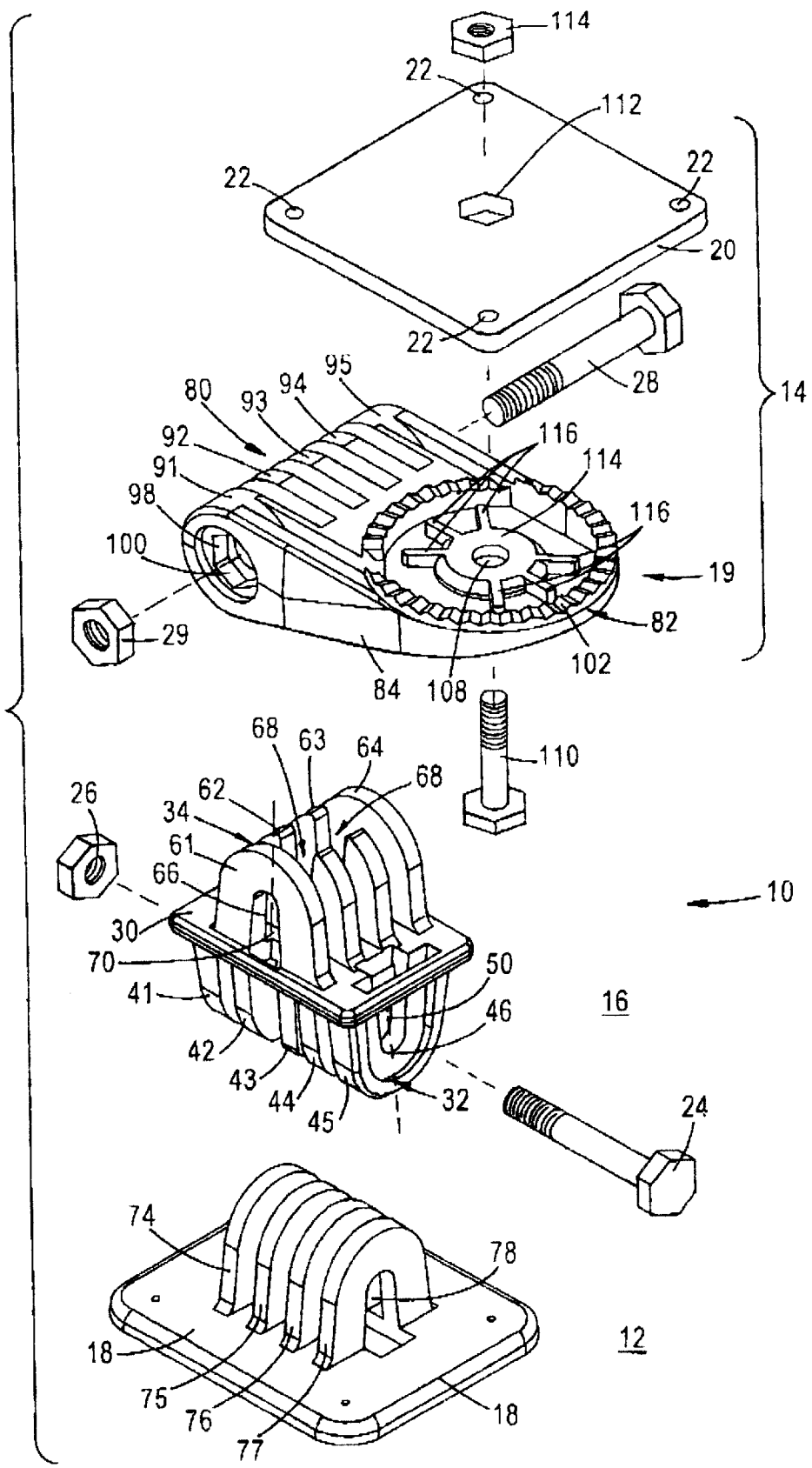
FIG. 3 is an exploded perspective view (from the first direction) of the mounting device illustrated in FIG. 1, in combination with the mounting plate.
Figure 4:
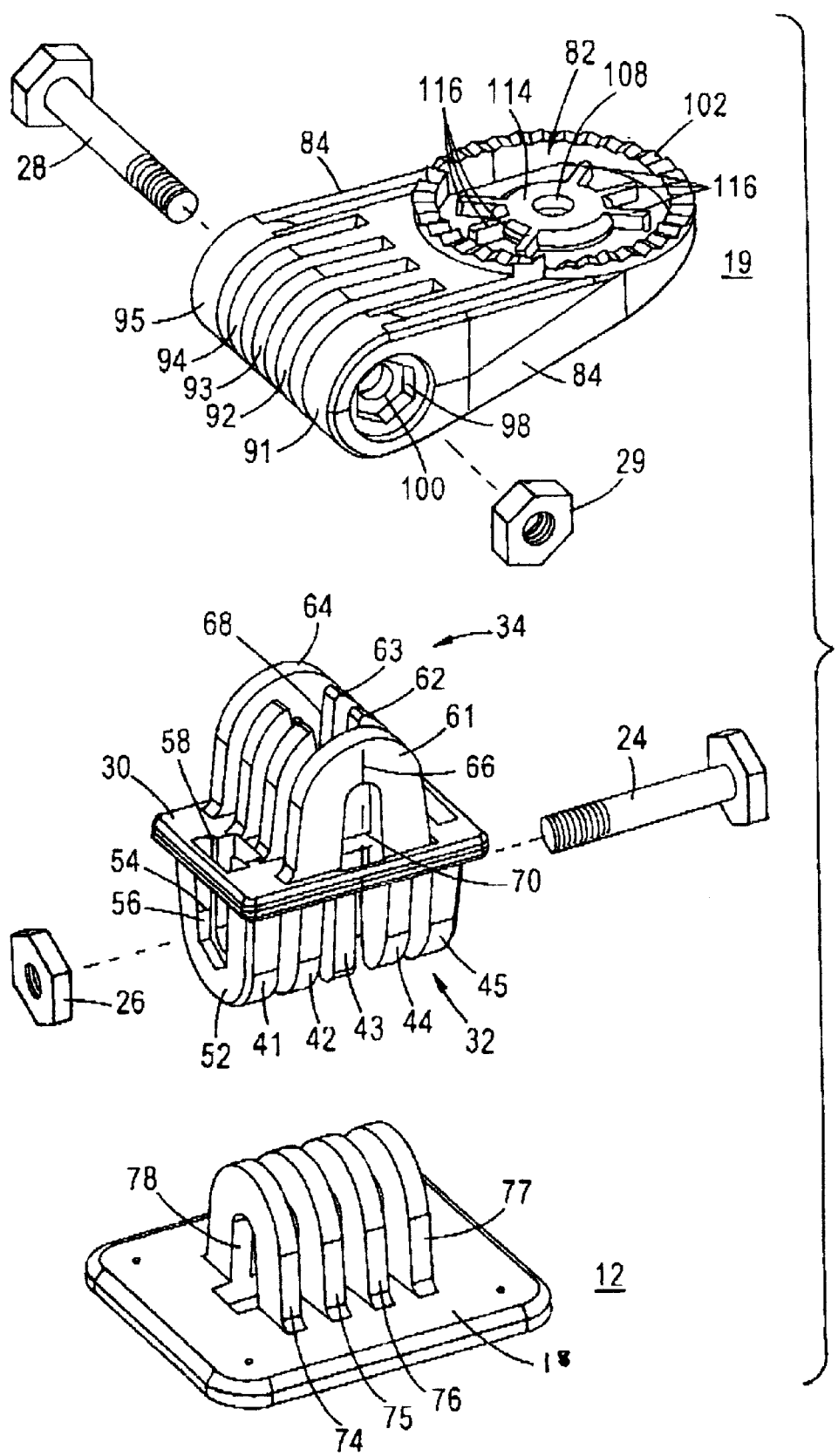
FIG. 4 is an exploded perspective view (from the second direction) of the mounting device illustrated in FIG. 1.
Figure 5:
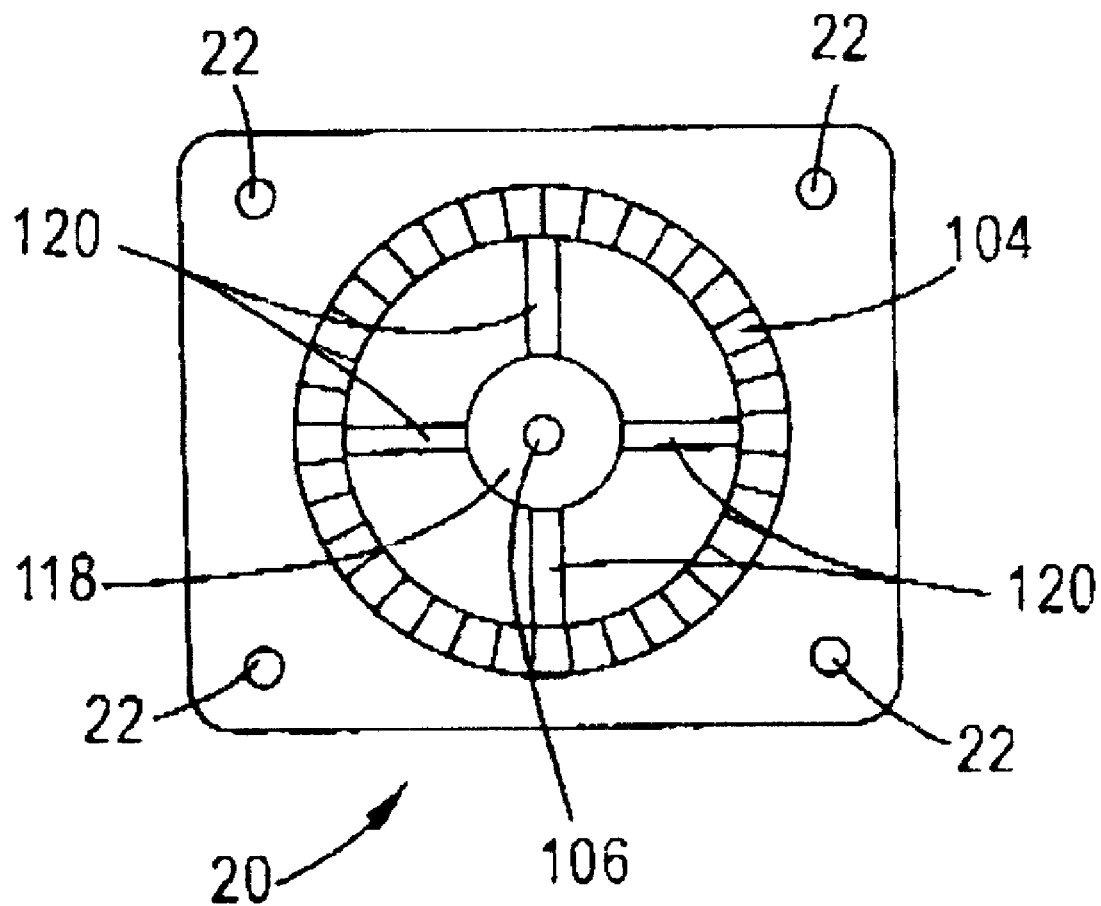
FIG. 5 is a bottom view of the mounting plate.

Reference is now made to the figures wherein mounting device 10 is illustrated as including first and second bases 12 and 14, and connector 16 which connects base 12 to base 14. Base 12 includes rectangular plate 18, which is preferably sized and shaped to receive a holder for a cellular telephone. Base 14 comprises tongue 19 that carries rectangular plate 20 (FIG. 3) including openings 22 adjacent each corner of the plate. Openings 22 enable fasteners, such as screws (not shown), to be inserted in the openings so the plate can be mounted on a dashboard or console of an automotive vehicle. A first fastener, in the form of threaded bolt 24 and hexagonal nut 26, fastens base 12 to connector 16, while a second fastener, in the form of threaded bolt 28 and hexagonal nut 29, fastens connector 16 to base 14. Each of base 12, connector 16, tongue 19 and plate 20, is a one-piece hard molded plastic structure.

Connector 16 includes central plate 30 from which extend two sets 32 and 34 of spaced, ear-like links. The links of set 32 extend toward base 12, while the links of set 34 extend toward base 14. There are five spaced aligned links 41–45 in set 32 and four slots between links 41–45. Each of links 41–45 and the slots between them lies in a separate parallel plane oriented at right angles to a plane defined by a face of plate 30. Each of links 41–45 has a longitudinal axis (indicated by dotted line 46 for link 45 in FIG. 3) intersecting, at right angles, the plane defined by a face of plate 30. Links 41 and 45, at opposite ends of set 32, have a U-shape, while each of interior links 42–44 includes an open-ended slot 48 that extends in the direction of dotted line 46. End links 41 and 45 include elongated interior slots 50 that extend in the direction of dotted line 46.

Slots 48 and 50 in links 41–45 form a passage for receiving threaded bolt 24. The outer face of end link 41 abuts ear shaped plate 52 having an interior slot 54 which is similar to slots 50 but which has a root including four straight sides 56 for receiving and holding in place hexagonal nut 26, having threads which mate with threads of threaded bolt 24. Placement of nut 26 against sides 56 is facilitated by plate 30 including opening 58 that is aligned with slot 54 and has a length slightly in excess of the distance between opposite edges of nut 26.

Set 34 includes four spaced aligned links 61–64 and three slots between links 61–64. Each of the links 61–64 and the slots between them lies in a separate parallel plane oriented at right angles to the plane defined by the face of plate 30 and at right angles to the planes where links 41–45 are located.

Each of links 61–64 has a longitudinal axis (indicated by dotted line 66 for link 61 in FIG. 3) intersecting, at right angles, the plane defined by a face of plate 30. Links 61 and 64, at opposite ends of set 34, have a U-shape, while each of interior links 62 and 63 includes an open-ended slot 68 that extends in the direction of dotted line 66. End links 61 and 64 include elongated interior slots 70 that extend in the direction of dotted line 66. Slots 68 and 70 in links 61–64 form a passage for receiving threaded bolt 28.

Base 12 includes plate 18 which carries four spaced aligned, ear-like links 74–77. Each of links 74–77 and the three slots between them lies in a separate parallel plane oriented at right angles to the plane defined by the face of plate 18 and parallel to the planes of links 41–45 when base 12 is fastened to connector 16 by bolt 24 and nut 26. Each of links 74–77 has a U-shape and an elongated interior slot 78 extending in the same direction as slots 48 and 50 in links 41–45 of connector 16 when bolt 24 and nut 26 fasten base 12 to connector 16 such that plates 18 and 30 are in parallel planes. Slots 48, 50 and 78 form a passage for receiving bolt 24. The dimensions and geometry of links 74–77 and the spaces between links 74–77 are substantially the same as the dimensions and geometry of links 41–45 and the spaces between links 41–45, to enable links 41–45 and 74–77 to be interleaved.

Base 12 is fastened to connector 16 by passing threaded bolt 24 through the passage formed by slots 48, 50 and 78 in interleaved links 41–45 and 74–77 and threading the bolt into nut 26 that is captured in sides 56 of plate 52. Typically, bolt 24 is threaded into nut 26 in such a manner as to enable base 12 to be manually turned about the longitudinal axis of bolt 24. Bolt 24 must be tightened against nut 26 by an amount to exert sufficient force on abutting faces of links 41–45 and 74–77 to maintain base 12 in place on connector 16 when a cellular telephone is placed on and removed from the holder carried by plate 18.

Tongue 19 includes, at opposite ends thereof, five spaced, ear-like links 91–95 and circular disc 82. Arms 84, that extend lengthwise of tongue 19, at opposite sides of the tongue, connect circular disc 82 to links 91–95. Each of links 91–95 and the four slots between them lies in a separate parallel plane extending in the same direction as arms 84, that is, parallel to the longitudinal axis of tongue 19 and parallel to links 61–64 when bolt 28 and nut 29 fasten tongue 19 to connector 16. Each of links 91–95 has a U-shape and an elongated interior slot (not shown), similar to the elongated interior slots 50, 70 and 78 of links 41–45, 61–64, and 74–77. The elongated interior slot in each of links 91–95 extends in the same direction as slots 70 in links 61–64 when tongue 19 is mounted on connector 16 in such a manner that the planes of plates 20 and 30 are parallel to each other. The slots in links 91–95, the slots between links 91–95, slots 70 in links 61–64 and the slots between links 61–64 form a passage for receiving bolt 28. The dimensions and geometry of links 91–95 and the spaces between links 91–95 are substantially the same as the dimensions and geometry of links 61–64 and the spaces between links 61–64, to enable links 61–64 and 91–95 to be interleaved.

Tongue 19 is fastened to connector 16 by passing threaded bolt 28 through the passage formed by the slots in interleaved links 61–64 and 91–95 and threading the bolt into threads of hexagonal nut 29 that is captured in hexagonal sides 98 of recess 100 of link 91. Typically, bolt 28 is threaded into nut 29 in such a manner as to enable base 14, including tongue 19 and plate 20, to be manually turned about the longitudinal axis of bolt 28. Bolt 28 must be tightened against nut 29 by an amount to exert sufficient force on abutting faces of links 61–64 and 91–95 to maintain base 14 in place on connector 16 when a cellular telephone is placed on and removed from the holder carried by plate 18.

To assist in holding tongue 19 on plate 20, a set of triangular shaped teeth 102 extends about the periphery of circular disc 82 of tongue 19 to engage corresponding teeth 104 on the bottom face of plate 20, that is, the face of plate 20 opposite from the face of plate 20 that abuts the dashboard or console of the automotive vehicle. Plate 20 and disc 82 respectively have aligned circular openings 106 and 108 through which threaded bolt 110 extends. The top face of plate 20 includes hexagonally shaped recess 112 for receiving and capturing hexagonal nut 114, while the bottom face of disc 82, that is, the face of disc 82 opposite from teeth 104, includes a circular recess (not shown) for receiving the head of bolt 110. Bolt 110 is threaded into nut 112 to fasten tongue 19 to plate 20. Teeth 102 and 104 prevent relative rotation between tongue 19 and plate 20. The structures of and connection between tongue 19 and plate 20 are strengthened by virtue of opening 108 in tongue 19 being surrounded by annular boss 114 from which ribs 116 radially extend and opening 106 in plate 20 being surrounded by annular boss 118 from which ribs 120 radially extend.

While there has been described and illustrated a specific embodiment of the invention, it will be clear that variations in the details of the embodiment specifically illustrated and described may be made without departing from the true spirit and scope of the invention as defined in the appended claims. For example, the device can be used to mount structures other than cellular telephone holders.

I claim:

1. A device for mounting a first structure on a second structure comprising: a first base adapted to have the first structure mounted thereon; a second base adapted to be mounted on the second structure; the first base including plural aligned first spaced links each extending in parallel planes oriented in a first direction so there is at least one first slot extending in the first direction between the first links; the second base including plural aligned second links, each extending in parallel planes oriented in a second direction so there is at least one second slot extending in the second direction between the second links; a connector connecting the first base to the second base, the connector including (a) plural aligned third spaced links each extending in parallel planes oriented in the first direction so there is at least one third slot extending in the first direction between the third links, and (b) plural aligned fourth spaced links each extending in parallel planes oriented in the second direction so there is at least one fourth slot extending in the second direction between the fourth links; the first and third links and first and third slots being interleaved with each other for enabling the first base to turn relative to the connector about a first axis at right angles to the first direction; the second and fourth links and second and fourth slots being interleaved with each other for enabling the second base to turn relative to the connector about a second axis at right angles to the second direction; a first fastener fastening the first base to the connector; and a second fastening the second base to the connector.

2. The device of claim 1 wherein the first fastener extends longitudinally along the first axis and the second fastener extends longitudinally along the second axis.

3. The device of claim 2 wherein the first fastener includes a first bolt having a longitudinal axis extending along the first axis and the second fastener includes a second bolt having a longitudinal axis extending along the second axis.

4. The device of claim 1 wherein the third and fourth links extend in opposite directions from a central portion of the connector.

5. The device of claim 4 wherein the first and second directions are at right angles to each other.

6. The device of claim 1 wherein the first base includes a plate for connecting the first base to the first structure.

7. The device of claim 6 wherein the plate is rotatable with respect to the second base and the second base and plate include matching, engaged teeth maintaining the plate and second base at a fixed position with respect to each other.

8. The device of claim 2 wherein the first and second directions are right angles to each other.

9. A device for mounting a first structure on a second structure comprising: a first base adapted to have the first structure mounted thereon; a second base adapted to be mounted on the second structure; the first base including plural aligned first spaced links each extending in parallel planes oriented in a first direction so there is at least one first slot extending in the first direction between the first links; the second base including plural aligned second links, each extending in parallel planes oriented in a second direction so there is at least one second slot extending in the second direction between the second links; a connector for connecting the first base to the second base, the connector including (a) plural aligned third spaced links each extending in parallel planes oriented in the first direction so there is at least one third slot extending in the first direction between the third links, and (b) plural aligned fourth spaced links each extending in parallel planes oriented in the second direction so there is at least one fourth slot extending in the second direction between the fourth links; the first and third links and first and third slots being adapted to be interleaved with each other for enabling the first base to turn relative to the connector about a first axis at right angles to the first direction; the second and fourth links and second and fourth slots being adapted to be interleaved with each other for enabling the second base to turn relative to the connector about a second axis at right angles to the second direction; a first fastener for fastening the first base to the connector; and a second fastener for fastening the second base to the connector.

10. The device of claim 9 wherein the first fastener is adapted to extend longitudinally along the first axis and the second fastener is adapted to extend longitudinally along the second axis.

11. The device of claim 10 wherein the first fastener includes a first bolt having a longitudinal axis adapted to extend along the first axis and the second fastener includes a second bolt having a longitudinal axis adapted to extend along the second axis.

12. The device of claim 9 wherein the third and fourth links extend in opposite directions from a central portion of the connector.

13. The device of claim 12 wherein the first and second bases and the connector are arranged so the first and second directions are adapted to be at right angles to each other.

14. The device of claim 9 wherein the first base includes a plate for connecting the first base to the first structure.

15. The device of claim 14 wherein the plate is adapted to be rotatable with respect to the second base and the second base and plate include matching teeth for maintaining the plate and second base at a fixed position with respect to each other.

16. A connector for connecting a first base to a second base so the first base can rotate about a first axis extending in a first direction and the second base can rotate about a second axis extending in a second direction, the connector comprising a plurality of aligned first spaced links each extending in first parallel planes at right angles to the first axis so there is at least one first slot between the first spaced links extending in the same direction as the first planes, a plurality of aligned second spaced links each extending in second parallel planes at right angles to the second axis so there is at least one second slot between the second spaced links extending in the same direction as the second planes, the first spaced links and the at least one first slot being adapted to receive aligned third spaced links of the first base in an interleaved manner, the second spaced links and the at least one second slot being adapted to receive aligned fourth spaced links of the second base in an interleaved manner.

17. The connector of claim 16 wherein the first and second spaced links extend in opposite directions from a central portion of the connector.

18. The connector of claim 17 wherein the first and second axes are at right angles to each other.

19. The connector of claim 18 wherein the first links and the first at least one slot are arranged so there is a first passage for receiving a fastener between the first links in the direction of the first axis, and the second links and the second at least one slot are arranged so there is a second passage for receiving a fastener between the second links in the direction of the second axis.

20. The connector of claim 16 wherein the first links and the first at least one slot are arranged so there is a first passage for receiving a fastener between the first links in the direction of the first axis, and the second links and the second at least one slot are arranged so there is a second passage for receiving a fastener between the second links in the direction of the second axis.

21. The connector of claim 16 further including a plate having first and second opposite faces respectively carrying the first and second links.

22. The device of claim 1 wherein the connector includes a plate having first and second opposite faces respectively carrying the third and fourth links.

23. The device of claim 7 wherein the connector includes a plate having first and second opposite faces respectively carrying the third and fourth links.

24. The device of claim 9 wherein the connector includes a plate having first and second opposite faces respectively carrying the third and fourth links.

25. The device of claim 24 wherein the first and second bases and the connector are arranged so the first and second directions are adapted to be at right angles to each other.

* * * * *